(12) United States Patent
Lee

(10) Patent No.: US 9,928,568 B2
(45) Date of Patent: Mar. 27, 2018

(54) DISPLAY DEVICE

(71) Applicant: Samsung Display Co., Ltd., Yongin, Gyeonggi-Do (KR)

(72) Inventor: Seung Wook Lee, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 133 days.

(21) Appl. No.: 14/701,298

(22) Filed: Apr. 30, 2015

(65) Prior Publication Data
US 2016/0180768 A1     Jun. 23, 2016

(30) Foreign Application Priority Data
Dec. 19, 2014   (KR) .................. 10-2014-0184626

(51) Int. Cl.
| | | |
|---|---|---|
| *G09G 5/00* | (2006.01) | |
| *G06T 1/60* | (2006.01) | |
| *G09G 5/02* | (2006.01) | |
| *G09G 3/00* | (2006.01) | |
| *G09G 3/3233* | (2016.01) | |

(52) U.S. Cl.
CPC .............. *G06T 1/60* (2013.01); *G09G 3/006* (2013.01); *G09G 3/3233* (2013.01); *G09G 5/02* (2013.01); *G09G 2300/0408* (2013.01); *G09G 2300/0426* (2013.01); *G09G 2320/028* (2013.01); *G09G 2320/0233* (2013.01); *G09G 2320/0242* (2013.01); *G09G 2320/0285* (2013.01); *G09G 2320/08* (2013.01)

(58) Field of Classification Search
CPC ............... G06G 3/32; G09G 5/10; G09G 5/02

USPC .......................................... 345/690, 87, 204
See application file for complete search history.

(56) References Cited

U.S. PATENT DOCUMENTS

| | | | | |
|---|---|---|---|---|
| 6,917,380 | B1 * | 7/2005 | Tay ....................... | H04N 5/367 348/247 |
| 7,542,861 | B1 * | 6/2009 | You ....................... | G01D 18/00 702/85 |
| 2005/0083281 | A1 * | 4/2005 | Kasai ................... | G09G 3/2092 345/87 |
| 2010/0149079 | A1 * | 6/2010 | Yamashita ........... | G09G 3/3233 345/87 |
| 2011/0193892 | A1 * | 8/2011 | Eom ..................... | G09G 3/3266 345/690 |
| 2012/0313104 | A1 | 12/2012 | Liu et al. | |

FOREIGN PATENT DOCUMENTS

| | | | |
|---|---|---|---|
| JP | 7-190889 A | 7/1995 | |
| JP | 2004-354684 | * 12/2004 | .............. G09G 3/20 |
| JP | 2006-013932 A | 1/2006 | |
| KR | 10-2007-0055912 A | 5/2007 | |

* cited by examiner

*Primary Examiner* — Jennifer Nguyen
(74) *Attorney, Agent, or Firm* — Kninne, Martens, Olson & Bear, LLP

(57) ABSTRACT

Display devices are disclosed. In one aspect, the display device includes a display panel having a display area including a plurality of pixels and a non-display area surrounding the display area. The display panel includes a plurality of gate lines and a plurality of data lines, and the gate and data lines are electrically connected to the pixels. The display device also includes a driving integrated circuit (IC) formed over the non-display area and configured to drive the pixels and a panel information memory formed over the non-display area and configured to store attribute information of the display panel.

17 Claims, 5 Drawing Sheets

DISPLAY DEVICE

CROSS-REFERENCE TO RELATED APPLICATION

This application claims priority to and the benefit of Korean Patent Application No. 10-2014-0184626 filed in the Korean Intellectual Property Office on Dec. 19, 2014, the entire contents of which are incorporated herein by reference.

BACKGROUND

Field

The described technology generally relates to a display device.

Description of the Related Technology

Currently, display devices such as a liquid crystal displays, field emission displays, plasma display panels, and organic light-emitting diode (OLED) displays are in wide use.

These displays includes a plurality of gate lines formed in a row direction, a plurality of data lines formed in a column direction, and a plurality of pixels arranged at regions where the gate lines and data lines intersect. The pixels are driven by gate signals and data voltages respectively transferred through the gate lines and the data lines.

SUMMARY OF CERTAIN INVENTIVE ASPECTS

One inventive aspect relates to a display device including attribute information of a display panel acquired in a panel inspection process.

Another aspect is a display device including: a display panel including a plurality of pixels and gate lines and data lines connected to the plurality of pixels; a driving integrated circuit (IC) formed in a non-display area outside a display area in which the plurality of pixels is formed on the display panel to drive the plurality of pixels; and a panel information memory formed in the non-display area to store unique attribute information of the display panel.

The unique attribute information of the display panel can include at least one of color coordinate information, viewing angle color sense information, luminance efficiency information, and the like of the display panel.

The panel information memory can be mounted on the non-display area in a panel process of forming the plurality of pixels, the gate line, and the data line on the display panel.

The driving IC can be mounted on the non-display area in a module process performed after the unique attribute information of the display panel is stored in the panel information memory.

The panel information memory can be mounted on a dead space at one side of the driving IC.

The panel information memory can be a one time programmable (OTP) memory.

The color coordinate information of the display panel can include color coordinates of red, green, and blue, respectively.

The viewing angle color sense information can include information on a difference between a color coordinate measured at the front side of the display panel and a color coordinate measured at the side.

The luminance efficiency information can include luminance information of each of the plurality of pixels according to a data voltage.

The panel information memory can include a plurality of memory cells, and each of the plurality of memory cells includes a transistor including a gate electrode connected to a first input terminal, one end connected to a first node, and the other end connected to a ground; a resistive element connected between a second input terminal and the first node; and an output terminal connected to the first node.

The resistive element can be made of a material which is changeable from high resistance to low resistance.

A selection signal turning on the transistor can be input to the first input terminal, the same voltage as the ground and a voltage higher than a breakdown voltage of the resistive element can be input to the second input terminal, and a bit value can be stored in each of the plurality of memory cells.

The selection signal can be input to the first input terminal, a driving voltage of a voltage lower than the breakdown voltage can be applied to the second input terminal, and the voltage of the first node can be output to the output terminal as any one of the low level voltage and the high level voltage.

The high level voltage can indicate bit information 1 and the low level voltage can indicate bit information 0.

The transistor can be an n-channel field effect transistor.

The transistor can be an oxide thin film transistor.

Each of the plurality of pixels can include a driving transistor including a gate electrode, a source electrode and a drain electrode positioned on an insulation substrate; a pixel electrode connected to the drain electrode; an organic light emitting member positioned on the pixel electrode; and a common electrode positioned on the organic light emitting member.

The organic light emitting member can emit light of any one color of red, green, and blue.

The unique attribute information of the display panel can be determined according to a formation thickness of the organic light emitting member.

Another aspect is a display device comprising a display panel having a display area including a plurality of pixels and a non-display area surrounding the display area, wherein the display panel includes a plurality of gate lines and a plurality of data lines, and wherein the gate and data lines are electrically connected to the pixels. The display device also comprises a driving integrated circuit (IC) formed over the non-display area and configured to drive the pixels and a panel information memory formed over the non-display area and configured to store attribute information of the display panel.

In the above display device, the attribute information includes at least one of color coordinate information, viewing angle color sense information and luminance efficiency information of the display panel.

In the above display device, the panel information memory is mounted over a dead space at one side of the driving IC.

In the above display device, the panel information memory includes a one-time programmable (OTP) memory.

In the above display device, the color coordinate information of the display panel includes color coordinates of red, green, and blue.

The above display device further comprises a color coordinate measuring device is configured to measure a color coordinate of a first selected pixel on a first side and a second selected pixel on a second side different from the first side, wherein the viewing angle color sense information includes information on the difference between the measured color coordinates.

In the above display device, the luminance efficiency information includes luminance information of each of the pixels based on a data voltage configured to be transferred via the data lines.

In the above display device, the panel information memory includes a plurality of memory cells each including a transistor including a gate electrode electrically connected to a first input terminal, a first end of the transistor electrically connected to a first node, and a second end of the transistor electrically connected to a ground terminal. In the above display device, the panel information memory also includes a resistive element electrically connected between a second input terminal and the first node and an output terminal electrically connected to the first node.

In the above display device, the resistive element is formed of a material having a variable resistance.

In the above display device, the first input terminal is configured to receive a selection signal from the driving IC, wherein the second input terminal is configured to receive a voltage that is substantially the same voltage as that of the ground terminal and higher than a breakdown voltage of the resistive element, and wherein each of the memory cells is configured to store a bit value.

In the above display device, the second input terminal is further configured to receive a driving voltage lower than the breakdown voltage, wherein the output terminal is configured to output first and second voltages different from each other.

In the above display device, the first voltage indicates bit information 1, wherein the second voltage indicates bit information 0.

In the above display device, the transistor is an n-channel field effect transistor.

In the above display device, the transistor is an oxide thin film transistor.

In the above display device, each of the pixels includes a driving transistor including a gate electrode, a source electrode and a drain electrode formed over an insulation substrate. In the above display device, each pixel also includes a pixel electrode electrically connected to the drain electrode, an organic light-emitting layer formed over the pixel electrode, and a common electrode formed over the organic light-emitting layer.

In the above display device, the organic light-emitting layer is configured to emit light of any one color of red, green, and blue.

In the above display device, the attribute information of the display panel is determined based on the thickness of the organic light-emitting layer.

Another aspect is a display device, comprising a display panel having a display area including a plurality of pixels and a non-display area surrounding the display area, wherein the display panel includes a plurality of gate lines and a plurality of data lines, and wherein the gate and data lines are electrically connected to the pixels. The display device also comprises a driving integrated circuit (IC) formed over the non-display area and configured to drive the pixels, a color coordinate measuring device configured to measure i) a color coordinate of a first selected pixel on a first side of the display panel and ii) a color coordinate of a second selected pixel on a second side different from the first side, and a panel information memory formed over the non-display area and configured to store attribute information of the display panel, wherein the attribute information includes at least one of color coordinate information, viewing angle color sense information and luminance efficiency information of the display panel.

In the above display device, the panel information memory includes a plurality of memory cells each including a transistor including a gate electrode electrically connected to a first input terminal, a first end of the transistor electrically connected to a first node, and a second end of the transistor electrically connected to a ground terminal. In the above display device, the panel information memory also includes a resistive element electrically connected between a second input terminal and the first node and an output terminal electrically connected to the first node.

In the above display device, the panel information memory is located adjacent to the driving IC.

According to at least one of the disclosed embodiments, it is possible to easily determine attribute information of the display panel acquired from a panel inspection process to thereby shorten production time without repetitively requiring a similar inspection in the production of the display device.

DETAILED DESCRIPTION OF CERTAIN INVENTIVE EMBODIMENTS

Figure 1:
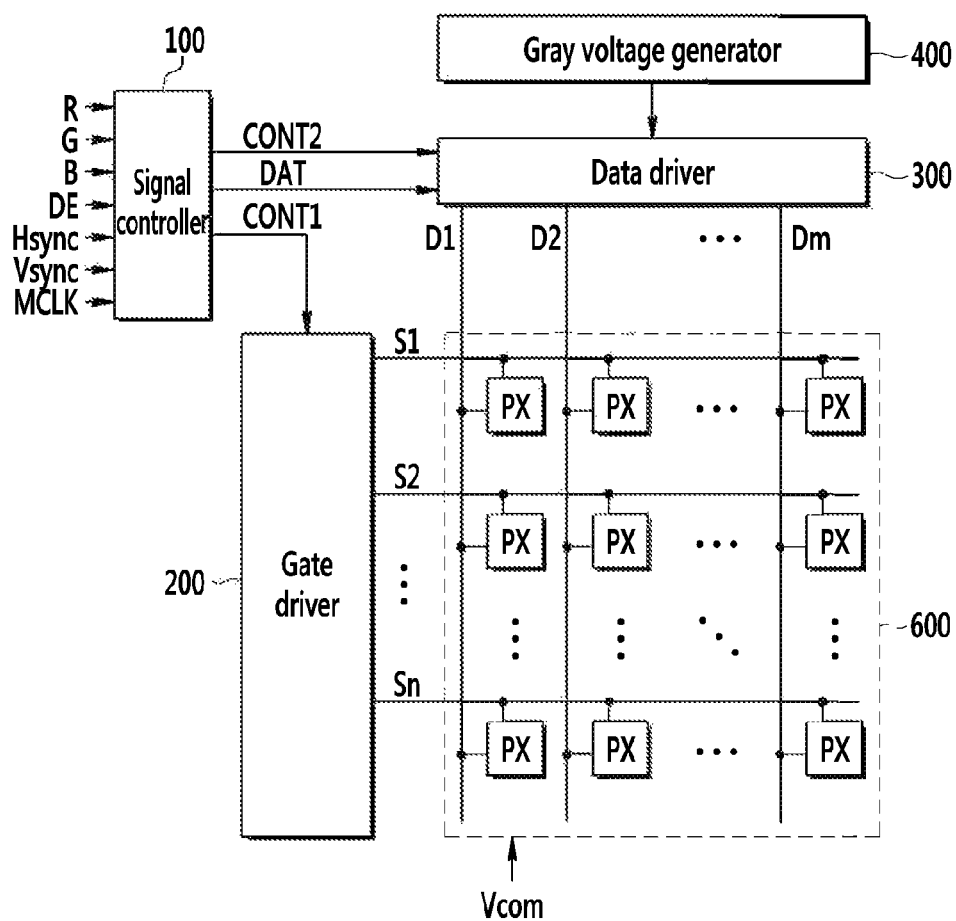
FIG. 1 is a block diagram of a display device according to an exemplary embodiment.

Generally, after a panel process in which the pixels, the gate lines, and the data lines are formed on the panel is performed, a module process in which a driving IC and the like are mounted on the panel is performed. In the panel process, panel inspection whereby checking a unique attribute of the panel and whether the pixels operate normally is performed. In the module process, after mounting the driving IC, module inspection whereby adjusting image quality of the panel is performed. The image quality of the panel varies according to a unique attribute of the panel, and the module inspection and panel inspection are similar in scope. The inspections are separately performed which can increase production time.

In order to solve this problem, the results of panel inspection need to be provided to the module process. However, in order to provide the results of panel inspection to the module process, all production systems that make use the results of each process (some of it redundant) need to be used. Therefore, costs and manufacturing time can increase.

The described technology will be described more fully hereinafter with reference to the accompanying drawings, in which exemplary embodiments are shown. As those skilled in the art would realize, the described embodiments can be modified in various different ways, all without departing from the spirit or scope of the described technology.

Further, in exemplary embodiments, since like reference numerals designate like elements having the same configuration, a first exemplary embodiment is representatively described, and in other exemplary embodiments, only a configuration different from the first exemplary embodiment will be described.

Accordingly, the drawings and description are to be regarded as illustrative in nature and not restrictive. Like reference numerals designate like elements throughout the specification.

Throughout this specification and the claims that follow, when it is described that an element is "coupled" to another element, the element can be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a display device according to an exemplary embodiment of the described technology will be described in detail with reference to the accompanying drawings. The display device according to the exemplary embodiment of the described technology can be any one of a liquid crystal display, a field emission display, a plasma display panel, and an OLED display. Hereinafter, for convenience of description, the liquid crystal display will be described as an example.

FIG. 1 is a block diagram of a display device according to an exemplary embodiment.

Referring to FIG. 1, the display device includes a signal controller 100, a gate driver 200, a data driver 300, a gray voltage generator 400, and a display panel 600.

The display panel 600 includes a plurality of gate lines S1-Sn, a plurality of data lines D1-Dm, and a plurality of pixels PX. The plurality of pixels PX is connected to the gate lines S1-Sn and the data lines D1-Dm to be arranged substantially in a matrix form. The gate lines S1-Sn extend substantially in a row direction to be substantially parallel to each other. The data lines D1-Dm extend substantially in a column direction to be substantially parallel to each other. A first power voltage ELVDD and a second power voltage ELVSS for driving the pixel PX are applied to the display panel 600.

The signal controller 100 receives image signals R, G, and B and an input control signal. The image signals R, G, and B store or carry luminance information of the pixels. The luminance has a predetermined number, for example, 1024 ($=2^{10}$), 256($=2^8$) or 64($=2^6$) of grays or grayscale values. The input control signal includes a data enable signal DE, a horizontal synchronization signal Hsync, a vertical synchronization signal Vsync, and a main clock signal MCLK.

The signal controller 100 generates a gate control signal CONT1, a data control signal CONT2, and an image data signal DAT according to the image signals R, G, and B, the data enable signal DE, the horizontal synchronization signal Hsync, the vertical synchronization signal Vsync, and the main clock signal MCLK. The signal controller 100 can generate an image data signal DAT by dividing the image signals R, G, and B by a frame unit according to the vertical synchronization signal Vsync and dividing the image signals R, G, and B by a gate line unit according to the horizontal synchronization signal Hsync.

The signal controller 100 provides the image data signal DAT and the data control signal CONT2 to the data driver 300. The data control signal CONT2 as a signal controlling an operation of the data driver 300 includes a horizontal synchronization start signal STH notifying the transmission start of the image data signal DAT, a load signal LOAD indicating the output of the data voltage to the data lines D1-Dm, and a data clock signal HCLK.

The signal controller 100 provides the gate control signal CONT1 to the gate driver 200. The gate control signal CONT1 includes at least one clock signal controlling the output of the scanning start signal STV and the gate-on voltage from the gate driver 200. The gate control signal CONT1 can further include an output enable signal OE limiting the duration of the gate-on voltage.

The gate driver 200 is connected to the gate lines S1-Sn and applies a gate signal to the gate lines S1-Sn. The gate signal has one of gate-on and gate-off voltages which turn on and off a switching transistor (see M1 of FIG. 2) connected to the gate lines S1-Sn.

The data driver 300 is connected to the data lines D1-Dm and selects a gray voltage from the gray voltage generator 400 according to the image data signal DAT. The data driver 300 applies the gray voltage to the data lines D1-Dm as the data voltage according to the data control signal CONT2. The gray voltage generator 400 can provide only a predetermined number of reference gray voltages without providing voltages for all grays. In this case, the data driver 300 can divide the reference gray voltage to generate gray voltages for all of the grays and select the data voltages among the generated gray voltages.

The gate signals of the gate-on voltages are sequentially applied to the gate lines S1-Sn by setting 1 horizontal period as a unit and the data voltages are applied to the data lines D1-Dm corresponding to the gate signals of the gate-on voltages, and as a result, the data voltages are applied to all the pixels PX to display images in one frame. The 1 horizontal period is referred to as '1H' and the same as one period of the horizontal synchronization signal Hsync and the data enable signal DE.

Each of the signal controller 100, the gate driver 200, the data driver 300, and the gray voltage generator 400 described above can be directly or indirectly mounted on the display panel 600 in at least one integrated circuit (IC) chip form, mounted on a flexible printed circuit film (not illustrated), attached to the display panel 600 in a tape carrier package (TCP) form, or mounted on a separate printed circuit board (not illustrated). Alternatively, the signal controller 100, the gate driver 200, the data driver 300, and the gray voltage generator 400 can be integrated on the display panel 600 together with the signal lines S1-Sn and D1-Dm.

Figure 2:
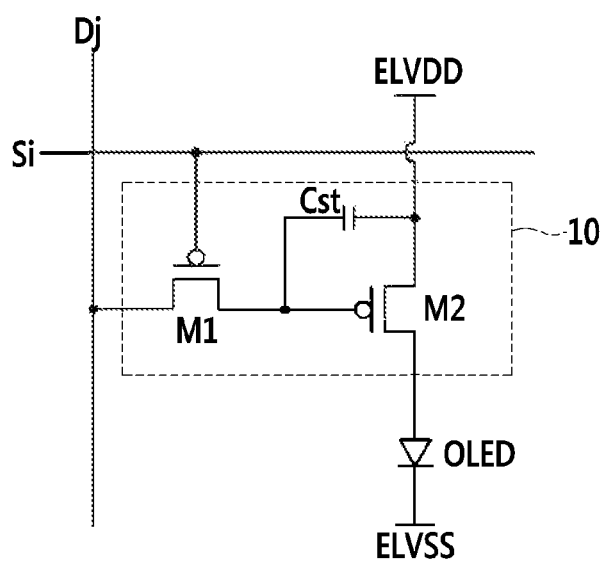
FIG. 2 is a circuit diagram illustrating one pixel in the display device according to the exemplary embodiment.

FIG. 2 is a circuit diagram illustrating an equivalent circuit of one pixel in the display device according to the exemplary embodiment.

Referring to FIG. 2, one pixel PX included in the display panel 600 will be described. A pixel PX connected to an i-th gate line Si and a j-th data line Dj (1<i≤n, 1≤j≤m) will be described as an example. The pixel PX includes an OLED and a pixel circuit 10 for controlling the OLED. The pixel circuit 10 includes a switching transistor M1, a driving transistor M2, and a storage capacitor Cst.

The switching transistor M1 includes a gate electrode connected to the gate line Si, one end connected to the data line Dj, and the other end connected to the gate electrode of the driving transistor M2.

The driving transistor M2 includes a gate electrode connected to the other end of the switching transistor M1, one end connected to the first power voltage ELVDD, and the other end connected to an anode of the OLED.

The storage capacitor Cst includes one end connected to the gate electrode of the driving transistor M2 and the other end connected to the first power voltage ELVDD. The storage capacitor Cst charges a data voltage applied to the gate electrode of the driving transistor M2 and maintains the data voltage even after the switching transistor M1 is turned off.

The OLED includes an anode connected to the other end of the driving transistor M2 and a cathode connected to the second power voltage ELVSS.

The switching transistor M1 and the driving transistor M2 can be p-channel field effect transistors. In this case, the gate-on voltage turning on the switching transistor M1 and the driving transistor M2 is a low level voltage, and the gate-off voltage turning on the switching transistor M1 and the driving transistor M2 is a high level voltage.

Here, the p-channel field effect transistor is illustrated, but at least one of the switching transistor M1 and the driving transistor M2 can be an n-channel field effect transistor. In this case, the gate-on voltage turning on the n-channel field effect transistor is a high level voltage, and a gate-off voltage turning off the n-channel field effect transistor is a low level voltage.

When the gate-on voltage is applied to the gate line Si, the switching transistor M1 is turned on, and the data voltage applied to the data line Dj is applied to one end of the storage capacitor Cst through the turned-on switching transistor M1 to charge the storage capacitor Cst. The driving transistor M2 controls a current amount flowing from the first power voltage ELVDD power to the OLED in response to the voltage value charged in the storage capacitor Cst. The OLED generates light corresponding to the current amount flowing through the driving transistor M2.

The OLED can display light of one of the primary colors. As an example of the primary colors, three primary colors of red, green, and blue are included, and a desired color is displayed in a spatial sum or a temporal sum of the three primary colors. In this case, some OLEDs can display white light, and as a result, luminance is increased. Unlike this, OLEDs of all of the pixels PX can display white light, and some pixels PX can further include color filters (not illustrated) changing the white light emitted from the OLED into any one of the primary colored light.

The aforementioned structure of the pixel is one exemplary embodiment, and in the described technology, the structure of the pixel is not limited and can be variously changed.

Hereinafter, the structures of the driving transistor M2 and the OLED included in the pixel will be described in detail with reference to FIGS. 3 and 4.

Figure 3:
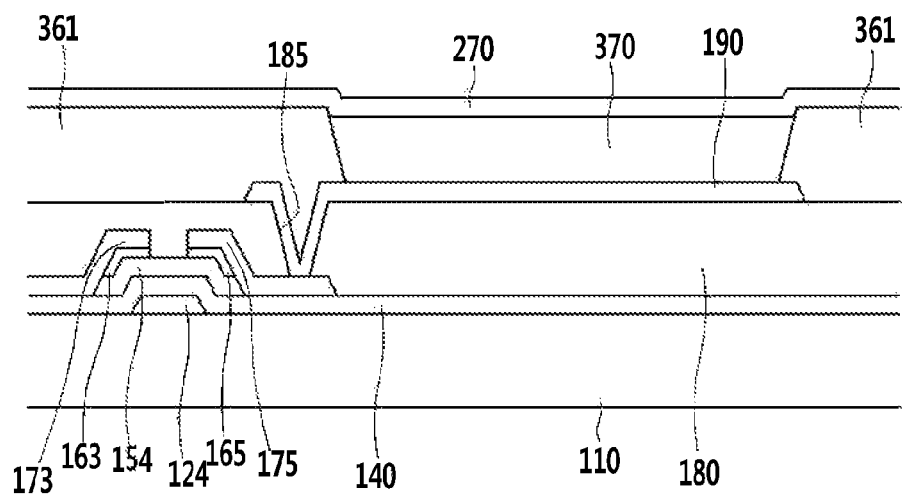
FIG. 3 is a cross-sectional view illustrating cross sections of a driving transistor and an OLED of one pixel in the display device according to the exemplary embodiment.

FIG. 3 is a cross-sectional view illustrating cross sections of a driving transistor and an OLED of one pixel in the display device according to the exemplary embodiment. FIG. 4 is a schematic diagram of the OLED of the display device according to the exemplary embodiment.

Figure 4:
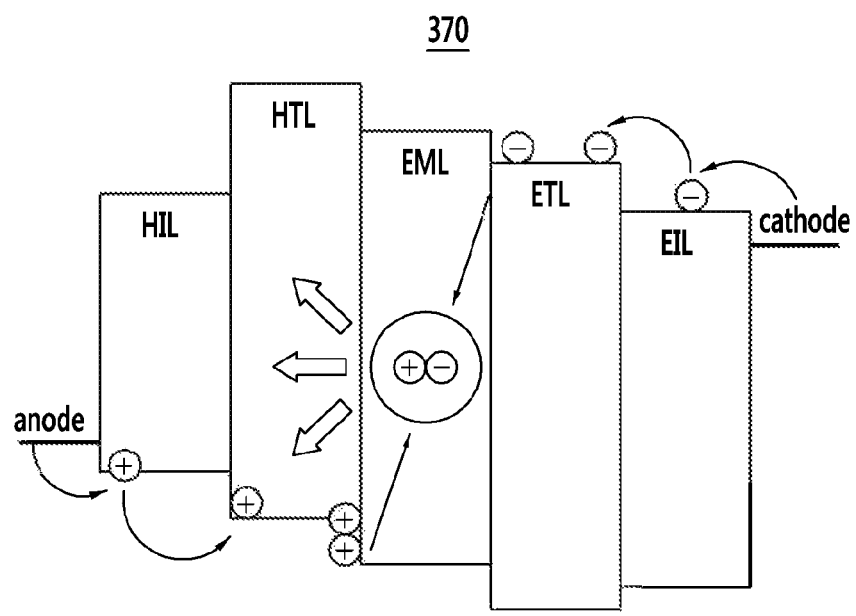
FIG. 4 is a schematic diagram of the OLED of the display device according to the exemplary embodiment.

Referring to FIGS. 3 and 4, a gate electrode 124 is positioned on an insulation substrate 110. The gate electrode 124 can be formed of an aluminum-based metal such as aluminum (Al) and an aluminum alloy, a silver-based metal such as silver (Ag) a silver alloy, a copper-based metal such as copper (Cu) and a copper alloy, a molybdenum-based metal such as molybdenum (Mo) and a molybdenum alloy, chromium (Cr), titanium (Ti), tantalum (Ta), and the like. Alternatively, the gate electrode 124 can have a multilayered structure including two conductive layers (not illustrated) having different physical properties. In this case, one conductive layer can be formed of a low resistivity metal, for example, an aluminum-based metal, a silver-based metal, and a copper-based metal which can reduce signal delay or voltage drop. The other conductive layer can be formed of a material having excellent physical, chemical, and electric contact characteristics such as indium tin oxide (ITO) and indium zinc oxide (IZO), for example, a molybdenum-based metal, chromium, titanium, tantalum, and the like. For example, a chromium lower layer and an aluminum (alloy) upper layer, and an aluminum (alloy) lower layer and a molybdenum (alloy) upper layer are included. However, the gate electrode 124 can be formed of various metals and conductors.

An insulating layer (insulating layer) 140 can be formed on the gate electrode 124. The insulating layer 140 can be formed of silicon nitride (SiNx).

A semiconductor 154 is positioned on the insulating layer 140. The semiconductor 154 can be formed of hydrogenated amorphous silicon, polycrystalline silicon, or the like.

On the semiconductor 154, a pair of ohmic contacts 163 and 165 is formed. The ohmic contacts 163 and 165 can be formed of silicide, a material such as n+ hydrogenated amorphous silicon in which an n-type impurity is doped at a high concentration, or the like.

On the ohmic contacts 163 and 165 and the insulating layer 140, a source electrode 173 and a drain electrode 175 are positioned. The source electrode 173 and the drain electrode 175 can be formed of a refractory metal such as chromium, a molybdenum-based metal, tantalum, titanium, and the like. Alternatively, the source electrode 173 and the drain electrode 175 can have a multilayered structure formed by a lower layer (not illustrated) formed of a refractory metal and an upper layer (not illustrated) formed of a low resistive material positioned thereon. An example of the multilayer structure includes a double layer of a chromium or molybdenum (alloy) lower layer and an aluminum upper layer, and a triple layer of a molybdenum (alloy) lower layer, an aluminum (alloy) intermediate layer, and a molybdenum (alloy) upper layer.

The source electrode 173 and the drain electrode 175 are separated from each other and positioned at both sides based on the gate electrode 124. The gate electrode 124, the source electrode 173, and the drain electrode 175 form the driving transistor M2 together with the semiconductor 154, and a channel thereof is formed in the semiconductor 154 between the source electrode 173 and the drain electrode 175.

The ohmic contact 163 is formed between the semiconductor 154 and the source electrode 173, and the ohmic contact 165 is formed between the semiconductor 154 and the drain electrode 175. The ohmic contacts 163 and 165 serve as lower contact resistance between the semiconductor 154 and the source electrode 173 and drain electrode 175, respectively. An exposed portion which is not covered by the source electrode 173 and the drain electrode 175 exists in the semiconductor 154.

A passivation layer 180 is formed over the source electrode 173, the drain electrode 175, the exposed semiconductor 154, and the insulating layer 140. The passivation layer 180 can be formed of an inorganic insulating material such as silicon nitride or silicon oxide, an organic insulating material, or the like. The surface of the passivation layer 180 can be substantially flat. Further, the passivation layer 180 can be formed by a double layered structure of a lower inorganic layer and an upper organic layer so as to protect the exposed portion of the semiconductor 154 and protect the organic layer. In the passivation layer 180, a contact hole 185 exposing the drain electrode 175 is formed.

On the passivation layer 180, a pixel electrode 190 is formed. The pixel electrode 190 can be physically and electrically connected to the drain electrode 175 through the contact hole 185. The pixel electrode 190 can be formed of a transparent conductive material such as ITO or IZO or an excellent reflective metal such as aluminum or a silver alloy.

A partition wall 361 is further formed on the passivation layer 180. The partition wall 361 defines an opening by surrounding an edge periphery of the pixel electrode 190 like a bank and is formed of an organic insulating material or an inorganic insulating material.

On the pixel electrode 190, an organic light emitting member or organic light-emitting layer 370 is formed, and the organic light emitting member 370 is confined within the opening surrounded by the partition wall 361.

The organic light emitting member 370 can have a multilayered structure including additional layers for improving light emission efficiency of an emitting layer EML in addition to the emitting layer EML as illustrated in FIG. 4. The additional layers include an electron transport layer (ETL) and a hole transport layer (HTL) for balancing electrons and holes, and an electron injecting layer (EIL) and a hole injecting layer (HIL) for reinforcing injection of the electron and the hole. The additional layers can be omitted.

On the partition wall 361 and the organic light emitting member 370, a common electrode 270 to which a common voltage Vcom is applied is formed. The common electrode 270 can be formed of a reflective metal including calcium (Ca), barium (Ba), aluminum (Al), or the like or a transparent conductive material such as ITO or IZO.

The opaque pixel electrode 190 and the transparent common electrode 270 are applied to a top emission type OLED in which an image is displayed in an upper direction of the display panel 600. The transparent pixel electrode 190 and the opaque common electrode 270 are applied to a bottom emission type OLED in which an image is displayed in a lower direction of the display panel 600.

The pixel electrode 190, the organic light emitting member 370, and the common electrode 270 form the OLED illustrated in FIG. 2, and the pixel electrode 190 becomes an anode and the common electrode 270 becomes a cathode. Alternatively, the pixel electrode 190 becomes a cathode and the common electrode 270 becomes an anode. The OLED emits light of one of the primary colors according to a material of the organic light emitting member 370. As an example of the primary colors, three primary colors of red, green, and blue are included, and a desired color is displayed in a spatial sum or a temporal sum of the three primary colors.

Figure 5:
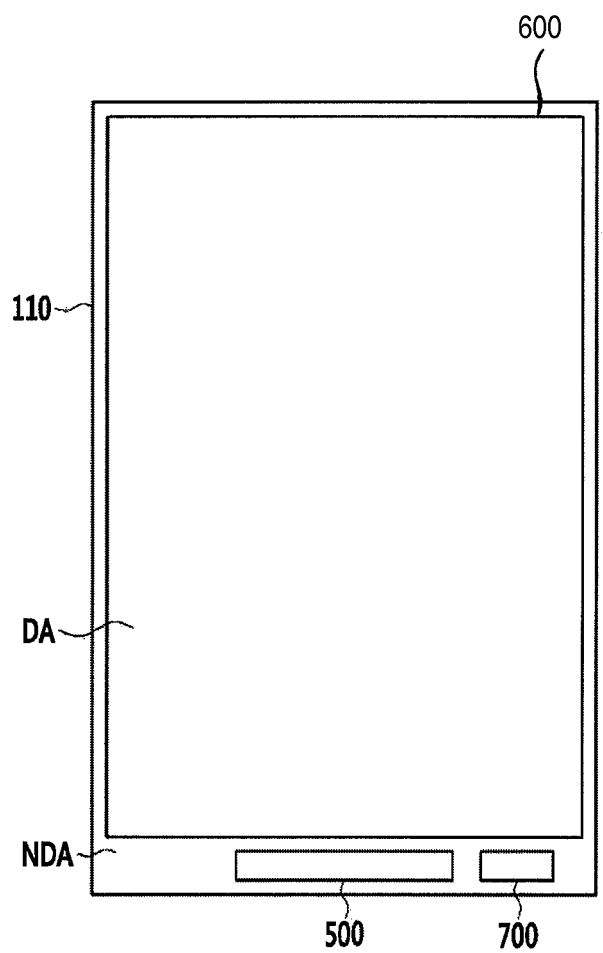
FIG. 5 is a layout view of a display panel of the display device according to the exemplary embodiment.

FIG. 5 is a layout view of a display panel of the display device according to the exemplary embodiment.

Referring to FIG. 5, the display panel includes a display area DA and a non-display area NDA. The display area DA is an area which includes a plurality of pixels PX formed on the insulation substrate 110 to display an image. The non-display area NDA is an area in which the image is not displayed as an outer area of the display area DA. On the non-display area NDA, a driving IC 500 for driving the pixels PX is mounted. The driving IC 500 can include the signal controller 100, the gate driver 200, the data driver 300, and the gray voltage generator 400 described in FIG. 1.

In the non-display area NDA, a dead space other than the area in which the driving IC 500 is formed exists. In the panel process of forming the pixels PX and the gate lines S1-Sn and the data lines D1-Dm connected to the pixels PX on the insulation substrate 110, a panel information memory 700 is mounted on the dead space of the non-display area NDA. The panel information memory 700 can be formed in the dead space at a left side or a right side of the driving IC 500.

In the panel information memory 700, unique attribute information of the display panel which is measured in the panel inspection process of checking the unique attribute of the panel after the pane process can be stored. A color coordinate measuring device (not shown) can measure the color coordinate of the display panel. The unique attribute information of the display panel can include color coordinate information, viewing angle color sense information, luminance efficiency information, and the like of the corresponding display panel. The color coordinate information respectively includes color coordinates of red, green, and blue. The viewing angle color sense information includes information on a change of the color sense according to a viewing angle, that is, information on a difference between a color coordinate measured at the front side of the display panel and a color coordinate measured at the side. The luminance efficiency information includes luminance information of each of the pixels according to a data voltage. In the panel process of forming the pixels on the insulation substrate 110, due to a limitation of the process, thicknesses of the organic light emitting member 370 and the like are not uniformly formed for every pixel or every display panel but have minute differences, and as a result, the unique attribute of the display panel is shown. That is, the unique attribute of the display panel can be determined according to a thickness of the organic light emitting member 370.

When the unique attribute of the display panel is measured in the panel process and stored in the panel information memory 700, in the module process of mounting the driving IC 500 thereafter, the module process and the module inspection process can be more rapidly performed by using the unique attribute information of the display panel. The driving IC 500 can transmit a selection signal to the first input terminal so as to select a memory cell.

The panel information memory 700 can be a one time programmable (OTP) memory. The OTP memory is a memory in which additional recording is permanently disabled when recording is performed once. That is, after recording the unique attribute information of the panel in the panel process, the unique attribute information of the panel recorded in the panel information memory 700 is only readable.

The panel information memory 700 can include a plurality of memory cells (not illustrated), and each memory cell stores one bit information (0 or 1). The panel information memory 700 can store bit information in the memory cells and represent the unique attribute information of the panel as stored bit information.

Hereinafter, one memory cell included in the panel information memory 700 will be described with reference to FIG. 6.

Figure 6:
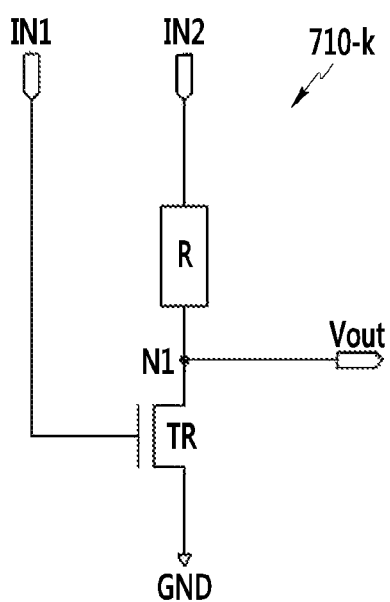
FIG. 6 is a circuit diagram illustrating one memory cell included in a panel information memory of the display device according to the exemplary embodiment.

FIG. 6 is a circuit diagram illustrating one memory cell included in a panel information memory of the display device according to the exemplary embodiment.

Referring to FIG. 6, one memory cell 710-k includes a transistor TR and a resistive element R.

The transistor TR includes a gate electrode connected to a first input terminal IN1, one end connected to a first node N1, and the other end connected to a ground GND. An output terminal Vout is connected to the first node N1. The transistor TR can be an n-channel field effect transistor. Alternatively, the transistor TR can be provided as a p-channel field effect transistor.

Meanwhile, the transistor TR can be an oxide thin film transistor (oxide TFT) in which a semiconductor layer is configured by an oxide semiconductor.

The oxide semiconductor material can include any one of oxides based on titanium (Ti), hafnium (Hf), zirconium (Zr), aluminum (Al), tantalum (Ta), germanium (Ge), zinc (Zn), gallium (Ga), tin (Sn), or indium (In), and zinc oxide (ZnO), indium-gallium-zinc oxide (InGaZnO4), indium-zinc oxide (Zn—In—O), zinc tin oxide (Zn—Sn—O), indium-gallium oxide (In—Ga—O), indium-tin oxide (In—Sn—O), indium-zirconium oxide (In—Zr—O), indium-zirconium-zinc oxide (In—Zr—Zn—O), indium -zirconium-tin oxide (In—Zr—Sn—O), indium-zirconium- gallium oxide (In—Zr—Ga—O), indium aluminum oxide (In—Al—O), indium-zinc-aluminum oxide (In—Zn—Al—O), indium-tin-aluminum oxide (In—Sn—Al—O), indium-aluminum-gallium oxide (In—Al—Ga—O), indium-tantalum oxide (In—Ta—O), indium-tantalum-zinc oxide (In—Ta—Zn—O), indium-tantalum-tin oxide (In—Ta—Sn—O), indium-tantalum-gallium oxide (In—Ta—Ga—O), indium-germanium oxide (In—Ge—O), indium-germanium-zinc oxide (In—Ge—Zn—O), indium-germanium-tin oxide (In—Ge—Sn—O), indium-germanium-gallium oxide (In—Ge—Ga—O), titanium-indium-zinc oxide (Ti—In—Zn—O), and hafnium-indium-zinc oxide (Hf—In—Zn—O) which are complex oxides thereof.

The semiconductor layer includes a channel region in which impurities are not doped, and a source region and a drain region formed at two sides of the channel region, in which impurities are doped. Herein, the impurities vary according to a kind of thin film transistor, and can be N-type impurities or P-type impurities.

In the case where the semiconductor layer is formed of the oxide semiconductor, in order to protect the oxide semiconductor from the environment such as exposure to a high temperature, a separate passivation layer can be added.

The resistive element R is connected between a second input terminal IN2 and the first node N1. The resistive element R is formed of a material which is changeable from high resistance to low resistance. For example, the resistive element R is formed by an aluminum (Al) layer coated as a ruthenium oxide (RuO$_2$) layer. In this case, a very thin aluminum oxide (Al$_2$O$_3$) layer is automatically formed between the ruthenium oxide layer and the aluminum layer. The aluminum oxide layer prevents a short circuit between the aluminum layer and the ruthenium oxide layer. As a result, the resistive element R has relatively high resistance.

In order to write bit information in the resistive element R, a selection signal is input to the first input terminal IN1, and a writing voltage is input to the second input terminal IN2. In this case, the output terminal Vout can be in a floated state. The transistor TR is turned on when the selection signal is input at the gate-on voltage. In this case, the writing voltage is input as a voltage of about 0 V such as the ground GND or a voltage higher than a breakdown voltage of the resistive element R. When the writing voltage is input as about 0 V, the resistive element R is maintained with high resistance as it is. On the other hand, when the writing voltage is input as the voltage higher than a breakdown voltage of the resistive element R, local breakdown of the aluminum oxide (Al$_2$O$_3$) layer of the resistive element R occurs, and a short circuit between the aluminum (Al) layer and the ruthenium oxide layer occurs. As a result, the resistive element R has relatively low resistance.

As such, the resistance of the resistive element R can be changed by selecting at least one memory cell 710-k from the memory cells as the selection signal and applying the writing voltage as any one of about 0 V or the breakdown voltage, and the bit value can be stored in the memory cell 710-k according to a resistance change of the resistive element R.

When the information stored in the panel information memory 700 is read, a predetermined driving voltage is applied to the first input terminal IN1 and the second input terminal IN2. The driving voltage is a voltage lower than the breakdown voltage of the resistive element R. When the resistive element R included in the memory cell 710-k is high resistance, the voltage of the first node N1 becomes a low level voltage which is substantially close to 0 V by the resistive element R, and the low level voltage is output to the output terminal Vout. When the resistive element R included in the memory cell 710-k has low resistance, the voltage of the first node N1 can have a high level voltage which is close to the driving voltage input to the second input terminal IN2, and the high level voltage can be output to the output terminal Vout. The high level voltage can be indicated as bit information 1, and the low level voltage can be indicated as bit information 0.

As such, the level of the voltage output from each memory cell is measured by applying the driving voltage to the memory cells to read the bit information.

The aforementioned configuration of the panel information memory 700 is one exemplary embodiment and is not limited thereto. The panel information memory 700 can be provided as various types of OTP memories. Further, the panel information memory 700 can be provided as a barcode type, a magnetic character reader (MCR) type, a multi time programmable (MTP), or the like.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A display device, comprising:
a display panel having a display area including a plurality of pixels and a non-display area surrounding the display area, wherein the display panel includes a plurality of gate lines and a plurality of data lines, and wherein the gate and data lines are electrically connected to the pixels;
a driving integrated circuit (IC) formed over the non-display area and configured to drive the pixels; and
a panel information memory formed over the non-display area and configured to store attribute information of the display panel, wherein the stored attribute information includes at least one of color coordinate information, viewing angle color sense information and luminance efficiency information of the display panel; and
wherein the panel information memory includes a plurality of memory cells each including:
a transistor including a gate electrode electrically connected to a first input terminal, a first end of the transistor electrically connected to a first node, and a second end of the transistor electrically connected to a ground terminal;
a resistive element electrically connected between a second input terminal and the first node; and
an output terminal electrically connected to the first node.
2. The display device of claim 1, wherein the panel information memory is mounted over a dead space at one side of the driving IC.

3. The display device of claim 1, wherein the panel information memory includes a one-time programmable (OTP) memory.

4. The display device of claim 1, wherein the color coordinate information of the display panel includes color coordinates of red, green, and blue.

5. The display device of claim 1, further comprising a color coordinate measuring device is configured to measure a color coordinate of a first selected pixel on a first side and a second selected pixel on a second side different from the first side, and wherein the viewing angle color sense information includes information on the difference between the measured color coordinates.

6. The display device of claim 1, wherein the luminance efficiency information includes luminance information of each of the pixels based on a data voltage configured to be transferred via the data lines.

7. The display device of claim 1, wherein the resistive element is formed of a material having a variable resistance.

8. The display device of claim 7, wherein the first input terminal is configured to receive a selection signal from the driving IC, wherein the second input terminal is configured to receive a voltage that is substantially the same voltage as that of the ground terminal and higher than a breakdown voltage of the resistive element, and wherein each of the memory cells is configured to store a bit value.

9. The display device of claim 8, wherein the second input terminal is further configured to receive a driving voltage lower than the breakdown voltage, and wherein the output terminal is configured to output first and second voltages different from each other.

10. The display device of claim 9, wherein the first voltage indicates bit information 1, and wherein the second voltage indicates bit information 0.

11. The display device of claim 1, wherein the transistor is an n-channel field effect transistor.

12. The display device of claim 1, wherein the transistor is an oxide thin film transistor.

13. The display device of claim 1, wherein each of the pixels includes:
a driving transistor including a gate electrode, a source electrode and a drain electrode formed over an insulation substrate;
a pixel electrode electrically connected to the drain electrode;
an organic light-emitting layer formed over the pixel electrode; and
a common electrode formed over the organic light-emitting layer.

14. The display device of claim 13, wherein the organic light-emitting layer is configured to emit light of any one color of red, green, and blue.

15. The display device of claim 13, wherein the attribute information of the display panel is determined based on the thickness of the organic light-emitting layer.

16. A display device, comprising:
a display panel having a display area including a plurality of pixels and a non-display area surrounding the display area, wherein the display panel includes a plurality of gate lines and a plurality of data lines, and wherein the gate and data lines are electrically connected to the pixels;
a driving integrated circuit (IC) formed over the non-display area and configured to drive the pixels;
a color coordinate measuring device configured to measure i) a color coordinate of a first selected pixel on a first side of the display panel and ii) a color coordinate of a second selected pixel on a second side different from the first side; and
a panel information memory formed over the non-display area and configured to store attribute information of the display panel, wherein the attribute information includes at least one of color coordinate information, viewing angle color sense information and luminance efficiency information of the display panel; and
wherein the panel information memory includes a plurality of memory cells each including:
a transistor including a gate electrode electrically connected to a first input terminal, a first end of the transistor electrically connected to a first node, and a second end of the transistor electrically connected to a ground terminal;
a resistive element electrically connected between a second input terminal and the first node; and
an output terminal electrically connected to the first node.

17. The display device of claim 16, wherein the panel information memory is located adjacent to the driving IC.

* * * * *